United States Patent [19]
Gillberg et al.

[11] Patent Number: 5,523,759
[45] Date of Patent: Jun. 4, 1996

[54] IN FLIGHT DOPPLER WEATHER RADAR WIND SHEAR DETECTION SYSTEM

[75] Inventors: Jeffrey M. Gillberg, Coon Rapids, Minn.; Gregory H. Piesinger, Cave Creek, Ariz.; Mitchell S. Pockrandt, Minneapolis, Minn.

[73] Assignee: Honeywell Inc., Minneapolis, Minn.

[21] Appl. No.: 105,670

[22] Filed: Aug. 16, 1993

Related U.S. Application Data

[63] Continuation of Ser. No. 868,617, Apr. 14, 1992, abandoned.

[51] Int. Cl.$^6$ ................................................. G01S 13/95
[52] U.S. Cl. ................................................. 342/26
[58] Field of Search ........................................ 342/26

[56] References Cited

U.S. PATENT DOCUMENTS

| | | | |
|---|---|---|---|
| Re. 33,152 | 1/1990 | Atlas | 342/26 |
| 4,649,388 | 3/1987 | Atlas | 342/26 |
| 4,667,199 | 5/1987 | Roberts | 342/26 X |
| 4,712,108 | 12/1987 | Schwab | 342/26 |
| 4,761,650 | 8/1988 | Masuda et al. | 342/26 |
| 4,940,987 | 7/1990 | Frederick | 342/26 |
| 4,965,573 | 10/1990 | Gallagher et al. | 342/26 X |
| 5,027,122 | 6/1991 | Wieler | 342/26 |
| 5,077,558 | 12/1991 | Kuntman | 342/26 |
| 5,130,712 | 7/1992 | Rubin et al. | 342/26 |
| 5,198,819 | 3/1993 | Susnjara | 342/26 |
| 5,202,690 | 4/1993 | Frederick | 342/26 |

OTHER PUBLICATIONS

Crane K., Robert, *IEEE Trans. on Geoscience Electronics*, "Automatic Cell Detection And Tracking", vol. GE–17, No. 4, Oct. 1979 pp. 250–262.

*Primary Examiner*—Gilberto Barrón, Jr.
*Attorney, Agent, or Firm*—Gregory A. Bruns

[57] ABSTRACT

An airborne doppler radar wind shear detection system has a volumetric scanning pattern for providing atmospheric measurement data for individual resolution cells that are formed into a 3-D grid of atmospheric data samples. Volumetric feature extraction modules identify and group resolution cells having particular features into air masses of interest. A spatial feature association and filtering module combines the air masses of interest into a 3-D representation of atmospheric conditions and filters out ground clutter. A contextual matching and temporal tracking module compares the 3-D representation to known wind shear models and compares successive 3-D representations to one another to aid in identifying hazardous wind shear conditions in the aircraft flight path.

21 Claims, 10 Drawing Sheets

IN FLIGHT DOPPLER WEATHER RADAR WIND SHEAR DETECTION SYSTEM

This application is a continuation of application Ser. No. 07/868,617, filed Apr. 14, 1992 now abandoned.

BACKGROUND OF THE INVENTION

The present invention relates generally to weather radar systems and particularly to airborne doppler radar systems used to predict potentially dangerous wind shear conditions in the flight path of the aircraft.

Microburst wind shear is one of the most serious hazards of aviation, and is particularly dangerous to heavily loaded jet transports flying low and slow on final approach or on takeoff before a comfortable margin of airspeed has been established. Pilots and engineers have learned to expect and deal with the nodal changes in horizontal winds as an aircraft descends. A microburst is different however and re,ires a very different response.

Typically a microburst is of very short duration and covers a small space geographically; the core of a microburst may be as small as 1 nautical mile or less in diameter. It appears suddenly, develops its dangerous potential and dissipates in a matter of minutes.

Early attempts to protect against this phenomenon included the development of a low-level wind shear alerting system. This alerting system consists of wind direction and velocity sensors around the perimeter of the airport., plus a central sensor. Data from the sensors are computed and displayed in the control tower and controllers then advise the pilots concerned. The information derived is seldom specific enough to justify aborting the takeoff or landing and the microbursts can sometimes pass undetected between the sensors or occur outside the sensor network.

Other efforts have resulted in wind shear warning systems aboard the aircraft. Presently systems are available which look at the inertial instrumentation and flight performance information aboard the aircraft and provide a warning when the accelerations experienced could be conducive to wind shear. These systems are called "reactive" systems because they detect hazardous flight conditions as the aircraft enters the wind shear condition. The problem is that reactive wind shear detection may not provide the pilot with enough time to successfully escape the dangerous condition.

A serious problem faced by airborne radar wind shear warning systems that are viewing the airspace in the aircraft glide path is how to deal with ground clutter. When ground based radar wind shear warning systems are used the ground clutter problem may be dealt with more easily since the ground clutter is essentially stationary. For example, with ground based radar a ground clutter map may be made periodically and then subtracted from the radar information. However, with airborne radar the ground clutter is seen in the primary antenna beam and is constantly changing.

SUMMARY OF THE INVENTION

The present invention solves these and other needs by providing an airborne wind shear detection system that provides advance warning of a hazardous wind shear condition. In accordance with the present invention an airborne wind shear detection doppler radar is provided which transmits successive beams into the airspace in front of an aircraft, receives reflected signals and analyzes the reflected signals for a hazardous wind shear condition. The radar utilizes a volumetric scan pattern which provides a three-dimensional (3-D) grid of atmospheric data samples, each characterized by a range, elevation and azimuth. Volumetric feature extraction processing identifies potential wind shear features within the 3-D grid. Spatial feature association processing groups data samples having the potential wind shear features into air masses of interest by grouping from upper elevation features downward. Filtering means removes noise and clutter from the air masses of interest and provides a 3-D representation of the air masses of interest. Contextual feature matching and temporal tracking module compares the current 3-D representation of air masses of interest to known 3-D wind shear models and to previous 3-D representations of the same air masses of interest, and provide an output signal when a hazard threshold is exceeded.

DETAILED DESCRIPTION OF THE PREFERRED EMBODIMENT

Figure 1:
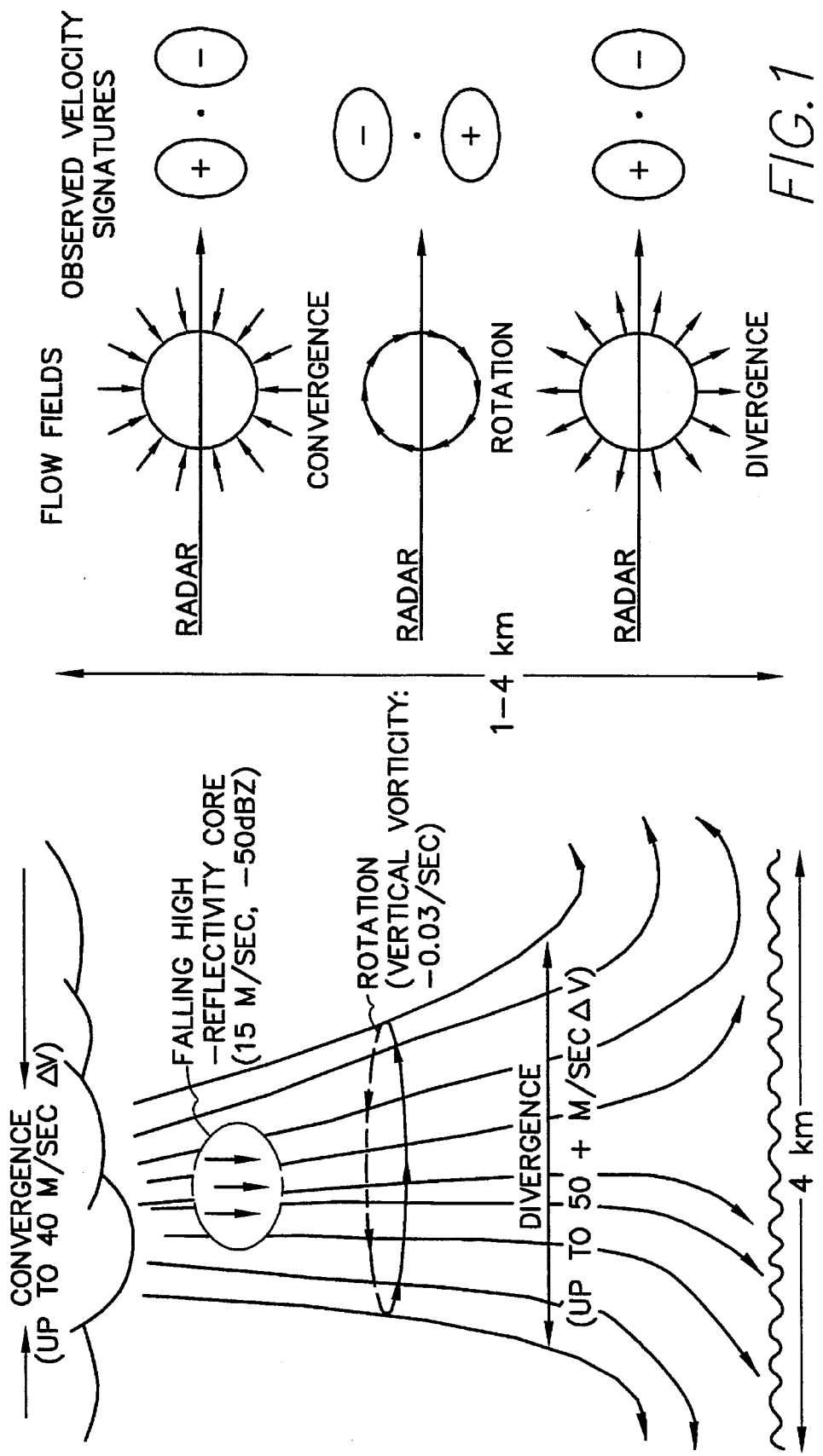
FIG. 1 illustrates a vertical slice of microburst winds and the microburst characteristics as seen from a Doppler radar.

The characteristics of a microburst as seen from a Doppler radar are described in FIG. 1. The left-hand side of FIG. 1 shows the major characteristics of microburst winds, and it can be seen that they are characterized by converging winds and vertical winds in the upper portion of the structure, rotation and slight divergence at mid-structure, and diverging winds in the lower portion of the structure. The overall diameter of a microburst is 4 km or less. The Doppler velocities that will be observed by the radar for convergence, rotation, and divergence are shown at the right side of FIG. 1 as observed velocity signatures.

A Doppler radar/clutter/microburst simulation capability for the volumetric scan approach has been developed by modifying software and models provided in User Guide for an Airborne Wind Shear Doppler Radar Simulation (AWDRS) program, Report #DOT/FAA/DS-90/7, June 1990. This simulation capability has provided us radar data samples for testing the concepts in the invention. In addition, we have developed our own software simulation of the wind shear detection system described herein.

SIMULATION RESULTS

Using the Doppler radar microburst signature simulation, sample data sets were generated to investigate signature detectability versus range and power, 3-D microburst signature characterization, and performance of the volumetric microburst detection algorithms. The radar transmit frequency for all of the data simulated was 9.3 GHz, and signatures from a wet microburst (maximum reflectivity ~60 dBZ) model and a dry microburst model (maximum reflectivity ~30 dBZ) were generated.

3-D MICROBURST SIGNATURE CHARACTERIZATION

Figure 4A:
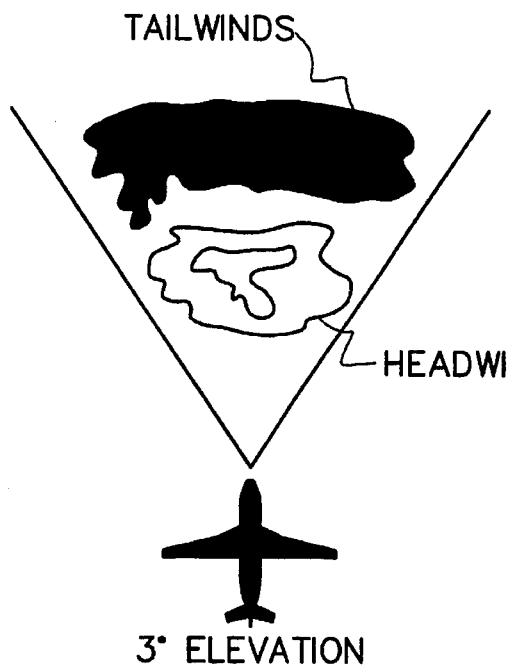
FIGS. 4a, 4b and 4c are an artists rendering of a wet microburst signature.
Figure 4B:
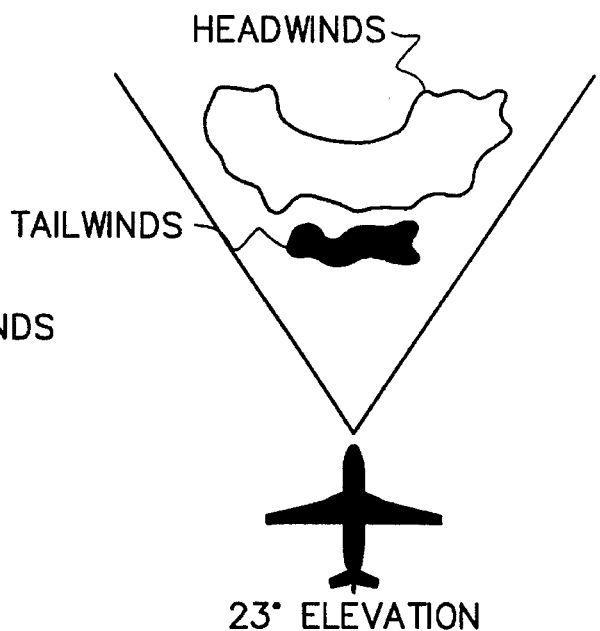
Figure 4C:
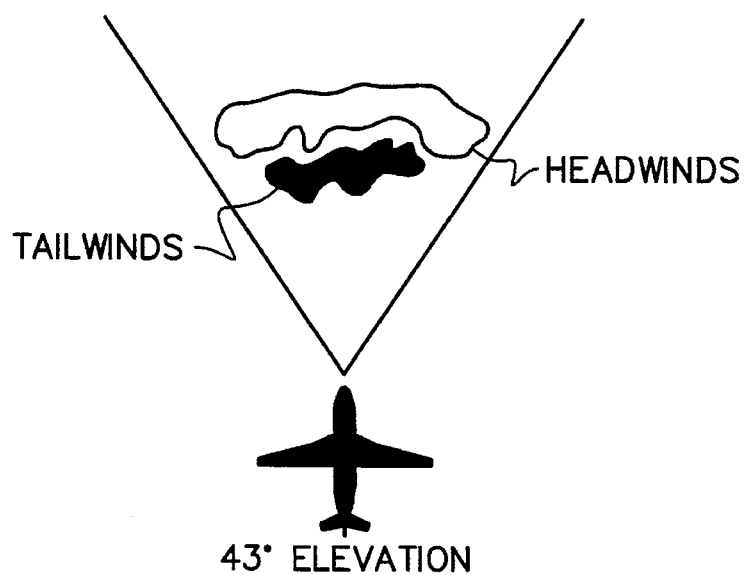

Using a transmit power and range to microburst that assured good signature quality, the signature characteristics of a wet and dry microburst were investigated. The results of this investigation show that the velocity signatures of the microbursts are clearly divergent for the lowest elevation scans (3 deg above the aircraft glide slope) and transform into a convergent signature within the next 10 deg of elevation. This seems to be due to the turbulent "rolling" of the wind outflow. The remainder of the upper scans (23, 33 and 43 deg above glide slope) always exhibit the signature of an approaching wind, sometimes accompanied by a receding wind signature at a slightly closer range (indicative of converging winds). The relatively strong approaching wind signature is probably due to convergence of the microburst winds amplified by the vertical wind component observable by the Doppler radar with an elevated scan angle. In turn, the receding wind signature will be attenuated by the vertical microburst wind component at elevated scan angles. Rotation signatures were not observed in this investigation due to the axis-symmetric nature of the microburst models used. Presently available complete microburst model renderings are under investigation to corroborate the robustness of observed rotational features in recognizing microburst wind shear. FIG. 4 show an artist's rendering of a wet microburst signature at three elevation "slices." The actual Doppler color images could not be used here due to publishing constraints. The dark colored areas are receding relative to the Doppler radar, and the light colored portions are approaching. Aircraft motion has been subtracted from the signatures.

Figure 2A:
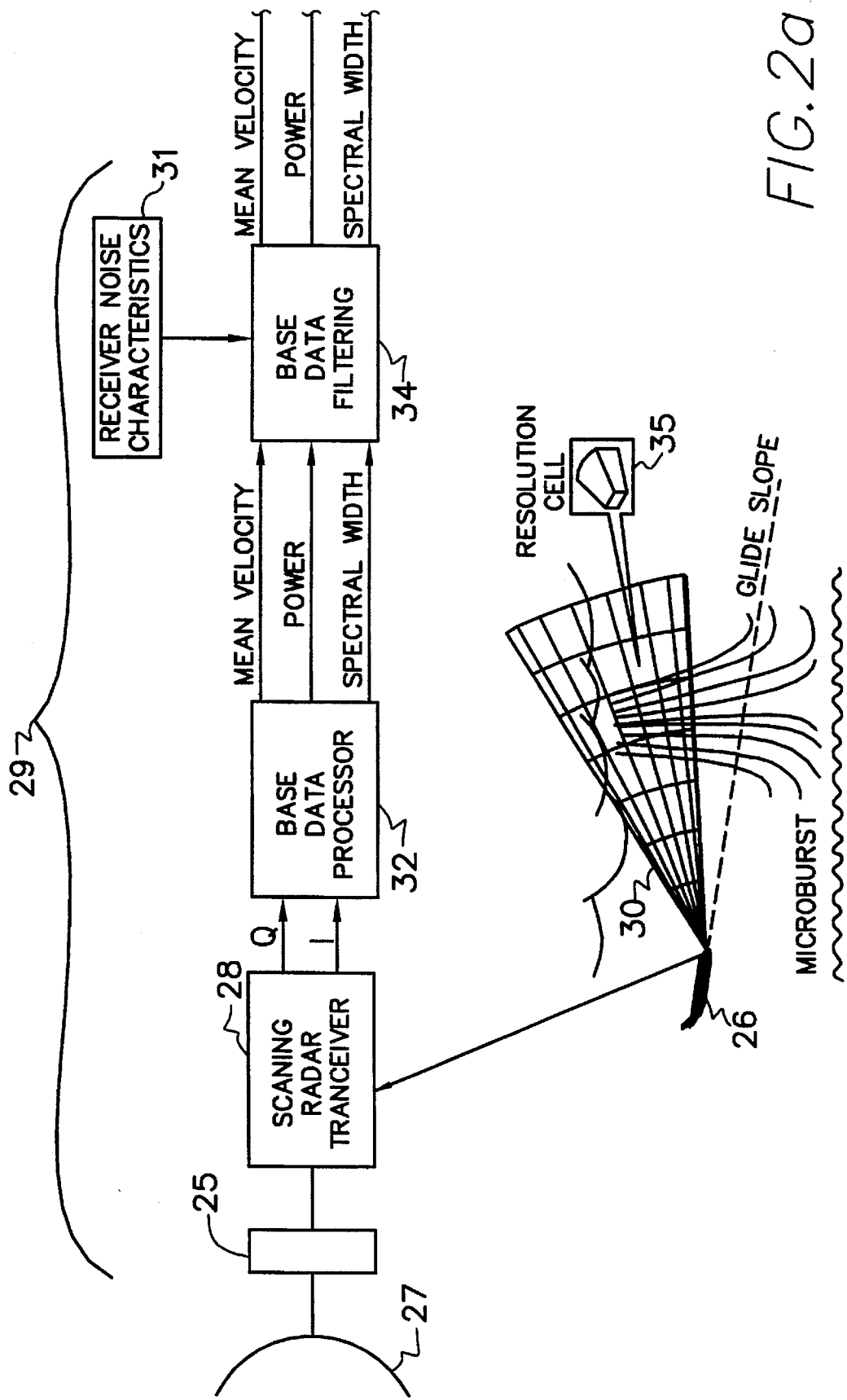
FIG. 2a and FIG. 2b illustrates the functional stages of the invention.
Figure 2B:
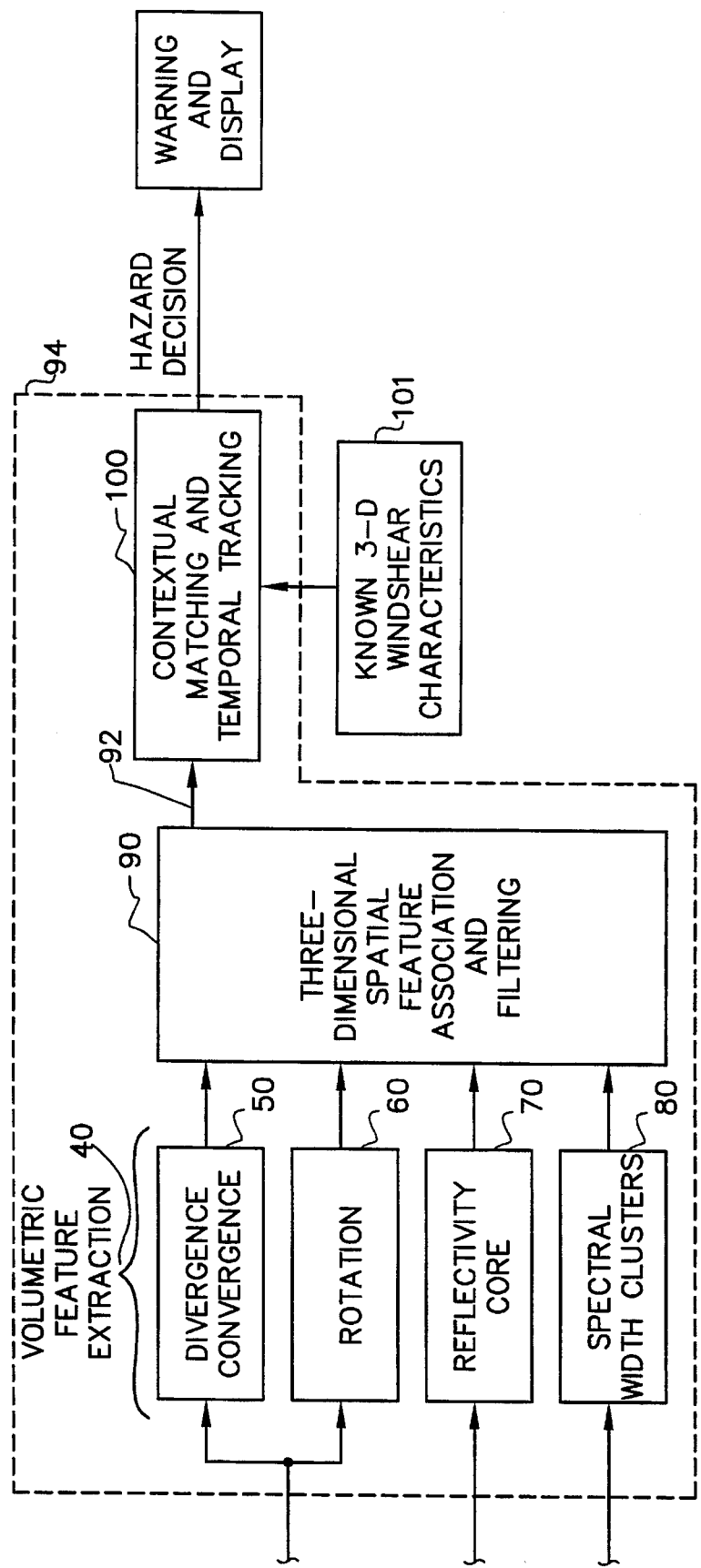
Figure 3:
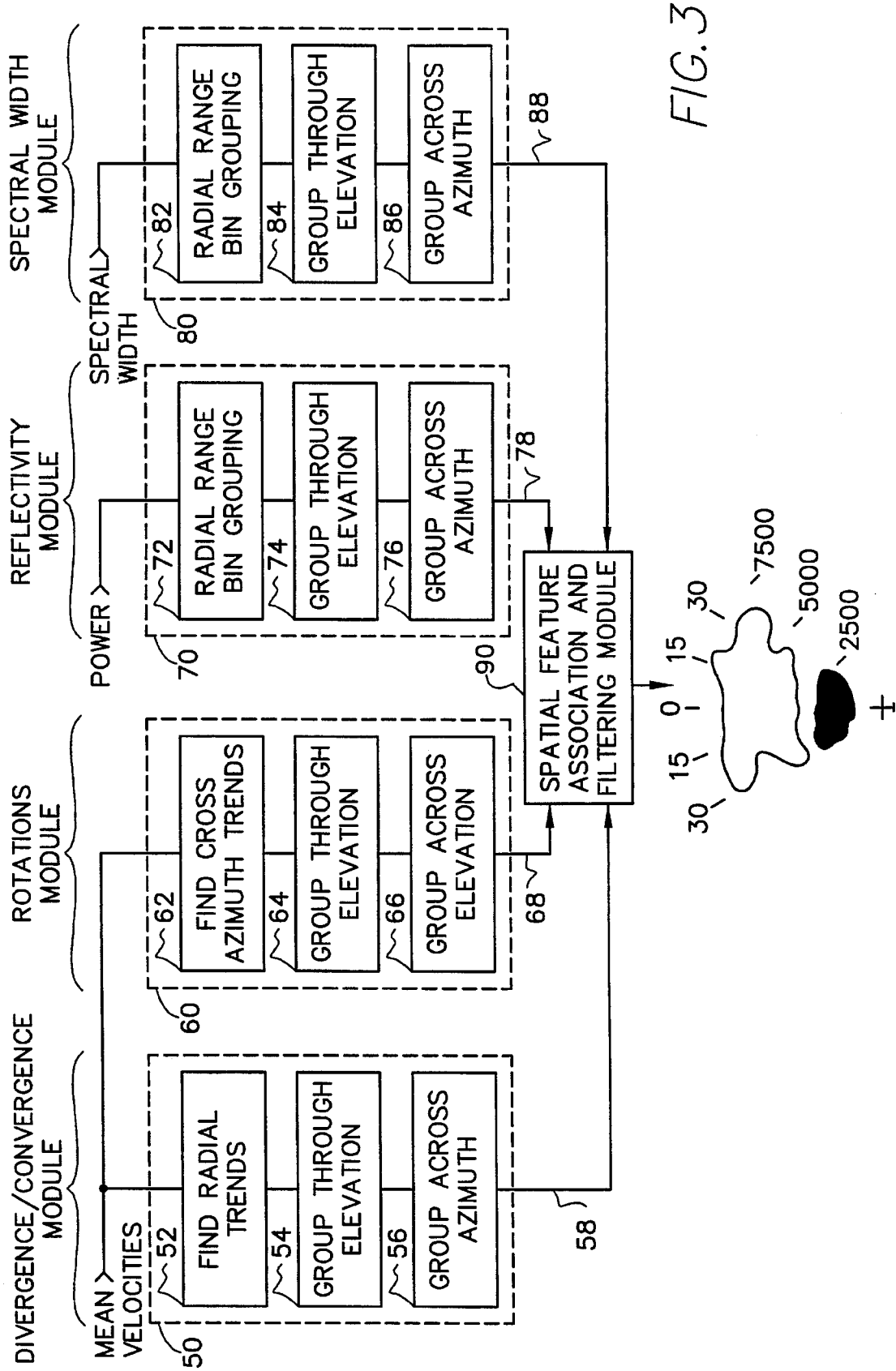
FIG. 3 reveals additional details of FIG. 2.

The wind shear detection system of the present invention utilizes a full 3-D volumetric scan pattern. 30 as illustrated in FIG. 2 to interrogate the region ahead of aircraft 26 by means of signals emitted and received by antenna 27. Scanning radar transceiver 28 includes an antenna driver 25 and is preferably designed to scan vertically in elevation and then step through the desired azimuth coverage as this scanning pattern seems most efficient for the detection of wind shear obstacles in front of aircraft 26. Scanning radar transceiver 28 provides both in-phase (I) and Quadrature (Q) data. Base data processor 32 performs processing required in order to analyze the Doppler radar returns to determine the presence of wind shear. Three "base" data products of returned power, mean velocity and spectral width must first be calculated from the raw radar samples. There are several known ways of calculating these products varying in complexity. The technique selected for the present invention was pulse pair processing, a technique that is relatively low in computational complexity and is widely used in pulsed Doppler weather radar signal processing. Base data filter unit 34 corrects for receiver noise characteristics 31 and filters the returned power, mean velocity and spectral width data.

Volumetric scanning pattern 30 of the present invention results in a grid of resolution cells 35 with each cell having a unique range, elevation and azimuth.

Volumetric feature extraction 40 requires Divergence/Convergence module 50, Rotation module 60, Reflectivity Core module 70 and Spectral Width Cluster module 80.

After the three base products are calculated for each cell in volumetric scan, individual characteristic features of the microburst are searched for and spatially grouped together. Once the individual signature features, i.e., divergence, convergence, rotation, high reflectivity, and high spectral width are located, they are spatially associated using the azimuthal-slice centroid of each feature. This association forms a 3-D representation of the radar observations, which can then be matched with the known microburst: characteristics as illustrated in FIG. 1. The observed 3-D representations are tracked from scan to scan and tested for consistency to provide robust detection. The velocity signatures that are potentially observable in a microburst are divergence, convergence, and rotation as illustrated in FIG. 1. The potential shear conditions that exist are along each radial scan, i.e., divergence or convergence or along each azimuth scan, i.e., clockwise or counterclockwise rotation. The grouping algorithms operate on the differential velocity information obtained by subtracting the mean velocity of each cell from the previous cell. This subtraction is done along the radial scan line for divergence and convergence and is done across azimuth at a constant range for rotations. For a doppler radar base data processing approach that provides differential radial velocities directly, the subtraction step for computing the differential is only performed for locating rotations. The beginning and the end of a trend group .are identified by a consistent change of the differential velocity sign. The change of the differential velocity sign is along the radial for divergence and convergence and along the azimuth for rotations. The consistency of each sign change is tested with an operator that eliminates spurious velocity differentials. The shear value ($\Delta V/\Delta D$) and momentum ($\Delta V \times \Delta D$) of each trend group are calculated and are used to eliminate identified trend groups that are weak, i.e., low shear value and/or large shear momentum. Once the initial trend groups are found, they are grouped with other radial or azimuth trend groups using a proximity operator. Thus the grouping process of the present invention produces 3-D trend groups that identify and spatially associate consistent divergence, convergence, or rotations in the volumetric scan.

The additional radar system hardware required to implement the invention described herein is minimal. A basic doppler weather radar must already process the raw radar data to determine reflectivity, velocity and spectral width to generate standard displays of information. This is the bulk of the required computational power of the system, since typically many pulsed samples are averaged to determine these quantities. The conventional airborne weather radar functions are shown at 29. The additional computational power required by this invention is minimal compared to the determination of the basic doppler radar output data. It is envisioned that the algorithms shown in block diagram form at 94 be hosted in an additional one or two digital signal processing (DSP) chips and associated memory within the airborne radar system (based on typical doppler weather radar system parameters and scan rates, and state of the art DSP chip technology). This volumetric scan pattern should be easily accommodated by most commercially available airborne weather radar sets, since antennae are required to have system controlled "tilt management". Tilt management requires positioning motors to move the antenna in the elevation direction. Modification to the standard control mechanism to scan the antenna in an elevation azimuth step scan or similar pattern should be straightforward. A more detailed description of the invention is provided in the following.

In the more detailed descriptions that follow, references are made to certain portions of the volumetric scan pattern 30 employed by the radar to gather the grid of resolution cells 35. Several terms are used repeatedly to describe certain concepts; they are defined below.

Radial

One-dimensional portion of resolution cell grid covering all ranges for which radar data are measured at a given azimuth and elevation antenna position. A radial line segment is a portion of one complete radial.

Cross-Azimuth Arc

One-dimensional portion of resolution cell grid covering all azimuth angles for which radar data are measured at a given range and antenna elevation angle. A cross azimuth arc segment is a portion of one complete cross azimuth arc.

Azimuth Slice

Two-dimensional portion of resolution cell grid covering all ranges and all elevation angles for which radar data are measured at a given antenna azimuth angle.

Elevation Plane

Two-dimensional portion of resolution cell grid covering all ranges and all azimuth angles for which radar data are measured at a given antenna elevation angle.

Air Mass

The grouping algorithms operate to associate regions of similar feature value that meet certain threshold conditions. The resulting groups of the measured radar data are referred to as "air masses" of interest, meaning a region within the volumetric scan pattern that warrants further feature/pattern processing to determine the hazard to the aircraft. May also be referred to as "mass" or "mass of interest".

Look

A single complete volumetric scan may be referred to as a "look" or "full scan look".

As features are extracted and grouped from the measured radar data, the degree or extent that the algorithms have performed grouping is referred to as "one-dimensional," "two-dimensional" and "three dimensional" or "volumetric." Each grouping module ultimately results in 3-D or volumetric groups, meaning that feature association have been determined for all azimuths, elevations and ranges in the volumetric scan. Intermediate or partial groupings are referred to as one-dimensional or two-dimensional, depending on grouping process performed. For example, groupings performed along a radial or cross-azimuth arc are referred to as one-dimensional and groupings performed across an azimuth slice or elevation plane are referred to as two-dimensional.

Data From the Volumetric Scanning Pattern

The basic input to modules 50, 60, 70 and 80 described below is the output of the base data processor 32 and the base data filtering 34 previously described (page 6). The input for each module (50, 60, 70 or 80) will be either the mean velocity, reflectivity or spectral width values from modules 32 and 34. In addition, range, antenna position relative to the airframe and airframe attitude shall accompany each data sample to establish a mapping of data samples from the volumetric scan pattern 30 to the physical airspace ahead of the aircraft.

The current software implementation (described below) of the invention concepts assumes that the radar transceiver will scan through elevation before scanning through azimuth (i.e., the sensor will scan vertically as it steps through a horizontal scan). The concepts of invention are straightforwardly adaptable to work with different sequencing of the volumetric scan pattern.

Divergences/Convergences

Module 50 Output

Module 50 produces at 58 a list of volumetric (3-D) air masses with similar wind velocity gradients along the range distance dimension.. These gradients represent divergent and convergent air flows. The data associated with each member (a single air mass of interest) of the list includes:

An internal identifier.

The extreme positions of each of the six edges of the air mass as measured from the aircraft. That is, the range in azimuth, elevation, and range covered by the mass of interest.

Minimum, Maximum, and Average Shear Value and Shear Momentum found within the air mass.

A sublist of radial components of this air mass. For each radial line segment which makes up the volumetric air mass, we track the following information:

Minimum and Maximum range of this radial segment.
Change in air velocity over this segment.
Shear Value of this segment.
Shear Momentum of this segment.
Hazard F-Factor for this segment.
Elevation and Azimuth of this segment.

The hazard F-factor is described by R. L. Bowles in "Wind shear Detection, Warning, and Flight Guidance," NASA CP 10004: DOT/FAA/PS-87/2 October 1987. This factor relates doppler velocity measurements to aircraft dynamics to form a quantified hazard factor of impending wind shear.

Module 50 Input

Module 50 has as input the mean velocity data samples from the volumetric scanning pattern as previously described.

Submodules 52, 54 and 56

Air masses of interest are found by going through three major steps. First, for each radial of doppler velocities received (one velocity per each range bin in the radial), we compute the differential velocities between each range bin, then look for segments on the radial of similar velocity differentials (i.e. regions of changing velocity). Second, the segments found on each radial are compared to segments found in similar positions on the radial above it. Through these comparisons, we form a collection of 2-D air masses with similar rates of changing velocity. This process is repeated for all radials in a single azimuth slice of the scan (i.e. a single scan through elevations). Third, the 2-D air masses of one azimuth slice, are compared with the 2-D air masses of adjacent azimuth slices. These comparisons form the final collection of 3-D air masses which are the output of this module.

Find Radial Trends (1-D Grouping)

Submodule 52 Output

Submodule 52 creates a list of segments of interest on each radial. The information currently included for each segment in the list includes:
- Minimum and Maximum range of this radial segment.
- Change in air velocity over this segment.
- Shear Value of this segment.
- Shear Momentum of this segment.
- Hazard F-Factor for this segment.
- Elevation and Azimuth of this segment.

Submodule 52 Input

The unit of input to submodule 52 is a set of doppler velocities along a single radar radial. There is one velocity value for each range bin along the radial. The differences between the velocities in adjacent range bins are computed at the start of the submodule before looking for segments of interest along the radial.

The following operational parameters are also input to this submodule to fine tune its behavior:
- Shear Value and Shear Momentum Threshold—Only consider segments with shear and momentum values meeting a dual-parameter criterion based on a logical combination (i.e., and/or) of Shear and Shear Momentum Thresholds.
- Bin Count Threshold—Only consider segments containing at least this many Range Bins.
- Test Count Threshold—M of N test criteria to help filter spurious: data within a potential segment.
- Minimum Range—Only consider segments at or beyond this range distance.

Submodule 52 Process

Starting at the Far End of the radial, inward to the Minimum Range:
- Find the start (far end) of a segment of interest (a change in velocity trend) This is done by looking for a change of sign in the velocity differentials while checking the values of each range bin from the Far End. An M of N check is performed to be sure that Range Bin suspected of being the start of a group is not just a noisy value compared to neighboring Range Bins.
- Find the end (near end) of a segment of interest.
- Compute Shear Value for this segment: (Delta Velocity/ Delta Range Distance)
- Compute Shear Momentum for this segment: (Delta Velocity * Delta Range Distance)
- Add this segment to the list of 1-D segments of interest if each of the following thresholds is met: Bin Count Threshold, and logical combination of Shear Value Threshold and Shear Momentum Threshold.
- Look for the start of the next segment of interest.

Group Through Elevation (2-D Grouping) Submodule 54 Output

Submodule 54 creates a list of 2-D air masses of interest within a given azimuth slice. The data structure of this 2-D air mass list is identical to the 3-D air mass list described below as the output of the final submodule. Each member of this list will contain information of each set of radial segments that have been determined to belong to the same 2-D feature in the air mass.

Submodule 54 Input

Submodule 54 takes as input the list created by the Find Radial Trends (1-D Grouping) submodule described above. This submodule will operate on a single azimuth slice of radials at once.

The following operational parameters are also input to submodule 54 to fine tune its behavior:
- Adjacent Elevation Threshold—A segment of interest must be within a certain number of degrees in the elevation direction (the adjacent elevation threshold) of a segment on another radial in order to be logically considered part of the same 2-D mass.
- Adjacent Range Threshold—Segments on separate radials within the Adjacent Elevation Threshold must also be within similar range distances from the sensor. Segments may be considered part of the same mass if they are within this linear range distance of each other.

Submodule 54 Process

The highest elevation radial is the base for this grouping process.

Each segment of interest on this radial will become the top edge of a 2-D mass of interest.

Working downward from the second highest elevation radial to the lowest elevation radial: For each radial:

For each 1-D segment of interest on this radial:
Check the 1-D segments on the radials above this radial to find a higher segment which has the same characteristics (velocity differential trend) as this segment. Consider the Adjacent Elevation Threshold and Adjacent Range Threshold to make this decision.

If a higher segment meeting the thresholds is found, then this segment is added to the 2-D mass of the higher segment, otherwise this segment will become the top edge of a new 2-D mass of interest.

Group Across Azimuth (3-D Grouping) Submodule 56 Output

Submodule 56 produces a list of volumetric (3-D) air masses with similar wind velocity gradients. The data associated with each member (a single air mass of interest) of the list includes:
- An internal identifier.
- The extreme positions of each of the six edges of the air mass as measured from the aircraft. That is, the range in azimuth, elevation, and range covered by the mass of interest.
- Minimum, Maximum, and Average Shear Value and Shear Momentum found within the air mass.
- A sublist of radial components of this air mass. For each radial line segment (i.e. a portion of air mass between two range distances at a single elevation angle and a single azimuth angle from the aircraft's radar sensor) which makes up the volumetric air mass, we track the following information:

Minimum and Maximum range of this radial segment.
Change in air velocity over this segment.
Shear Value of this segment.
Shear Momentum of this segment.
Hazard F-Factor for this segment.
Elevation and Azimuth of this segment.

Submodule 56 Input

Submodule 56 takes as input the list created by the Group Through Elevation (2-D Grouping) submodule 54 described above. This submodule logically operates on a full scan "look" of data at once.

The following operational parameter is also input to submodule 56 to fine tune its behavior:

Adjacent Azimuth Threshold—A 2-D mass of interest in a single azimuth slice must be within a certain number of degrees in the azimuth direction (the adjacent azimuth threshold) of a 2-D mass of a nearby slice in order to be logically considered part of the same 3-D volumetric mass.

Submodule 56 Process

This algorithm uses either the right-most azimuth slice or the left-most azimuth slice as the base for the grouping process. This allows for bidirectional radar scans. Each 2-D mass of interest in the base azimuth slice will become the right/left edge of a 3-D air mass in the final output list of this module.

Working across from the second azimuth slice (next to the base azimuth slice) to the end azimuth slice at the opposite end of the scan: For each azimuth slice:

For each 2-D mass of interest in this azimuth slice:
Determine a "bounding ]box" and "centroid" for this mass in this slice.
Look through nearby (within Adjacent Azimuth Threshold) previous azimuth slices find a neighboring 2-D mass with the same characteristics (velocity differential trend) as this mass.
If a previous segment meeting these requirements is found, then this mass is added to the 3-D mass of the previous segment, otherwise this mass will become the right/left edge of a new 3-D mass of interest.

Rotations

Module 60 Output

Module 60 produces at 68 a list of volumetric (3-D) air masses with similar wind velocity gradients along the cross-azimuth dimension. These gradients represent rotational airflows to the doppler radar (since the radar senses radial velocities only). The data associated with each member (a single air mass of interest) of the list includes:

An internal identifier.
The extreme positions of each of the six edges of the air mass as measured from the aircraft. That is, the range in azimuth, elevation, and range covered by the mass of interest.
Minimum, Maximum, and Average Rotation Value and Rotation Momentum found within the air mass.
A sublist of cross-azimuth arc components of this air mass. For each cross-azimuth arc segment which makes up the volumetric air mass, we track the following information:
Left and Right Azimuth of this cross-azimuth arc segment.
Change in air velocity over this segment.
Rotation Value of this segment.
Rotation Momentum of this segment.
Hazard Factor for this segment. (The intent of the "Hazard Factor" for rotations is to mimic the "F-Factor" used in divergences/convergences (previously discussed) for the case of the rotating wind field.)
Range and Elevation of this segment.

Module 60 Input

Module 60 has as input the mean velocity data samples from the volumetric scanning pattern as previously described.

Submodules 62, 64 and 66

Air masses of interest are found by going through three major steps. First, for each cross-azimuth arc in the full scan, we compute the differential velocities between adjacent range bins on the arc, then look for segments of similar velocity differentials (i.e., cross-azimuth regions of changing velocity). Second, the segments found on each arc are compared to segments at similar azimuth angles, at the same elevation angle, and at nearby range distances from the sensor. Through these comparisons we form a collection of 2-D air masses with similar rates of changing velocity in the cross-azimuth direction. This process is repeated for all cross-azimuth arcs in a single elevation plane. Third, the 2-D air masses of one elevation plane are compared with the 2-D air masses on elevation planes above them. These comparisons form the final collection of 3-D air masses which are the output of this module.

Find Cross-Azimuth Trends (1-D Grouping)

Submodule 62 Output

Submodule 62 creates a list of segments of interest on each cross-azimuth arc. The information currently included for each segment in the list includes:

Left and Right Azimuth of this cross-azimuth arc segment.
Change in air velocity over this segment.
Rotation Value of this segment.
Rotation Momentum of this segment.
Hazard Factor for this segment.
Range and Elevation of this segment.

Submodule 62 Input

Submodule 62 considers a single cross-azimuth arc as its basic unit of input. There is one velocity value for the range bin at each discrete azimuth angle along the arc. The differences between the velocities in adjacent range bins are computed at the start of the submodule before looking for segments of interest along the arc.

The following operational parameters are also input to this submodule 62 to fine tune its behavior:

Rotation Shear Value and Rotation Momentum Threshold—Only consider segments with rotation shear and rotation momentum values meeting a dual parameter critereon based on a logical combination (i.e., and/or) of rotation shear and rotation momentum thresholds.

Azimuth Distance Threshold—Only consider segments with measured length greater than this linear distance threshold (measured between the two ends of the segment).

Test Count Threshold—M of N test criteria to help filter spurious data within a potential segment.

Minimum Range—Only consider arcs at or beyond this range distance.

Submodule 62 Process

Starting at one end of the arc, across to the opposite end:

Find the start of a segment of interest (a change in velocity trend) This is done by looking for a change of sign in the velocity differentials while checking the values of each sample across the arc. An M of N check is performed to be sure that the sample suspected of being the start of a group is not just a noisy value compared to neighboring samples.

Find the end of a segment of interest.

Compute Rotation Shear Value for this segment: (Delta Velocity/Delta Distance)

Compute Rotation Momentum for this segment: (Delta Velocity , Delta Distance)

Add this segment to the list of 1-D segments of interest if the following thresholds are met: Azimuth Distance Threshold, and a logical combination of the Rotation Shear Value Threshold and Rotation Momentum Threshold.

Look for the start of the next segment of interest.

Group Through Range (2-D Grouping)

Submodule 64 Output

Submodule 64 creates a list of 2-D air masses of interest within a given elevation plane. The data structure of this 2-D air mass list is identical to the 3-D air mass list described below as the output of final submodule 66. Each member of this list will contain information of each set of cross-azimuth arc segments that have been determined to belong to the same 2-D feature in the air mass.

Submodule 64 Input

Submodule 64 takes as input the list created by the Find Cross-Azimuth Trends (1-D Grouping) submodule 62 described above. Submodule 64 will operate on a single elevation plane of radials at once.

The following operational parameters are also input to submodule 64 to fine tune its behavior:

Adjacent Range Threshold—A segment of interest must be within this range distance of a segment on another radial in order to be logically considered part of the same 2-D mass.

Adjacent Azimuth Threshold—Segments on separate radials within the Adjacent Range Threshold must also be within similar azimuth distances from the sensor. Segments may be considered part of the same mass if they are within this linear distance of each other.

Submodule 64 Process

The most distant (farthest range bin) cross-azimuth arc is the base for this grouping process.

Each segment of interest on this arc will become the far edge of a 2-D mass of interest.

Working inward from the second farthest range arc radial to the Minimum Range arc: For each arc:

For each 1-D segment of interest on this arc:

Check the 1-D segments on the arcs beyond this arc to find a segment which has the same characteristics (velocity differential trend) as this segment. Consider the Adjacent Range Threshold and Adjacent Azimuth Threshold to make this decision.

If a more distant segment meeting the thresholds is found, then this segment is added to the 2-D mass of the further segment, otherwise this segment will become the far edge of a new 2-D mass of interest.

Group Across Elevation (3-D Grouping)

Submodule 66 Output

Submodule 66 produces a list of volumetric (3-D) air masses with similar wind velocity gradients (representing rotations). The data associated with each member (a single air mass of interest) of the list includes:

An internal identifier.

The extreme positions of each of the six edges of the air mass as measured from the aircraft. That is, the range in azimuth, elevation, and range covered by the mass of interest.

Minimum, Maximum, and Average Rotation Value and Rotation Momentum found within the air mass.

A sublist of cross-azimuth arc components of this air mass. For each cross-azimuth arc segment which makes up the volumetric air mass, we track the following information:

Left and Right Azimuth of this cross-azimuth arc segment.

Change in air velocity over this segment.

Rotation Value of this segment.

Rotation Momentum of this segment.

Hazard Factor for this segment.

Range and Elevation of this segment.

Submodule 66 Input

Submodule 66 takes as input the list created by the Group Through Range (2-D Grouping) submodule described above.

The following operational parameter is also input to submodule 66 to fine tune its behavior:

Adjacent Elevation Threshold—A 2-D mass of interest in a single elevation plane must be within a certain number of degrees in the elevation direction (the adjacent elevation threshold) of a 2-D mass of an overhead plane in order to be logically considered part of the same 3-D volumetric mass.

Submodule 66 Process

This algorithm uses the highest elevation plane as the base for the grouping process. Each 2-D mass of interest in the base elevation plane becomes the top edge of a 3-D air mass in the final output list of this module.

Working down from the second highest elevation plane (next to the top elevation plane) to the lowest elevation plane at the bottom of the scan: For each elevation plane:

For each 2-D mass of interest in this elevation plane:

Determine a "bounding box" and "centroid" for this mass in this plane.

Look through nearby (within Adjacent Elevation Threshold) higher elevation planes to find a neighboring 2-D mass with the same characteristics (velocity differential trend) as this mass.

If a higher segment meeting these requirements is found, then this mass is added to the 3-D mass of the previous segment, otherwise this mass will become the top edge of a new 3-D mass of interest.

Reflectivity

Module 70 Output

Module 70 produces at 78 a list of volumetric (3-D) air masses with similar radar reflectivity values. The data associated with each member (a single air mass of interest) of the list includes:

An internal identifier.

The extreme positions of each of the six edges of the air mass as measured from the aircraft. That is, the range in azimuth, elevation, and range covered by the mass of interest.

Minimum, Maximum, and Average Reflectivity found within the air mass.

A sublist of radial components of this air mass. For each radial line segment which makes up the volumetric air mass, we track the following information:
Minimum and Maximum range of this radial segment.
Minimum, Maximum, and Average Reflectivity of this segment.
Elevation and Azimuth of this segment.

Module 70 Input

Module 70 has as input the radar reflectivity data samples from the volumetric scanning pattern as previously described.

Submodules 72, 74 and 76

Air masses of interest are found by going through three major steps. First, we look for segments on the radial of similar radar reflectivities. Second, the segments found on each radial are compared to segments found in similar positions on the radial above it. Through these comparisons, we form a collection of 2-D air masses with similar reflectivities. This process is repeated for all radials in a single azimuth slice of the scan (i.e. a single scan through elevations). Third, the 2-D air masses of one azimuth slice are compared with the 2-D air masses of adjacent azimuth slices. These comparisons form the final collection of 3-D air masses which are the output of this module.

Radial Range Bin Grouping (1-D Grouping)

Submodule 72 Output

Submodule 72 creates a list of segments of interest on each radial. The information currently included for each segment in the list includes:

Minimum and Maximum range of this radial segment.
Minimum, Maximum, and Average Reflectivity of this segment.
Elevation and Azimuth of this segment.

Submodule 72 Input

The unit of input to submodule 72 is a set of radar reflectivities along a single radar radial. There is one reflectivity value for each range bin along the radial.

The following operational parameters are also input to submodule 72 to fine tune its behavior:
Reflectivity Threshold—Only consider segments with a Reflectivity greater than this.
Bin Count Threshold—Only consider segments containing at least this many Range Bins.
Test Count Threshold—M of N test criteria to help filter spurious data within a potential segment.
Break Count Threshold—The number of Range Bins below the Reflectivity Threshold needed to determine a break between groups (hence, used to find the end of a group.)
Minimum Range—Only consider segments at or beyond this range distance.

Submodule 72 Process

Starting at the Far End of the radial, inward to the Minimum Range:
Find the start (far end) of a segment of interest (a reflectivity over threshold) An M of N sliding window check is performed to be sure that a Range Bin suspected of being the start of a group is not just a noisy value compared to neighboring Range Bins.
Find the end (near end) of a segment of interest (use Break Count Threshold to confirm).
Add this segment to the list of 1-D segments of interest if each of the following thresholds is met: Bin Count Threshold, Reflectivity Threshold.
Look for the start of the next segment of interest.

Group Through Elevation (2-D Grouping)

Submodule 74 Output

Submodule 74 creates a list of 2-D air masses of interest within a given azimuth slice. The data structure of this 2-D air mass list is identical to the 3-D air mass list described below as the output of the final submodule. Each member of this list will contain information of each set of radial segments that have been determined to belong to the same 2-D feature in the air mass.

Submodel 74 Input

Submodule 74 takes as input the list created by the Radial Range Bin Grouping (1-D Grouping) submodule described above. This submodule will operate on a single azimuth slice of radials at once.

The following operational parameters are also input to this submodule to fine tune its behavior:
Adjacent Elevation Threshold—A segment of interest must be within a certain number of degrees in the elevation direction (adjacent elevation threshold) of a segment on another radial in order to be logically considered part of the same 2-D mass.

Adjacent Range Threshold—Segments on separate radials within the Adjacent Elevation Threshold must also be within similar range distances from the sensor. Segments may be considered part of the same mass if they are within this linear range distance of each other.

Submodule 74 Process

The highest elevation radial is the base for this grouping process.

Each segment of interest on this radial will become the top edge of a 2-D mass of interest.

Working downward from the second highest elevation radial to the lowest elevation radial:

For each radial:

For each 1-D segment of interest on this radial:

Check the 1-D segments on the radials above this radial to find a higher segment which has similar reflectivity characteristics as this segment. Consider the Adjacent Elevation Threshold and Adjacent Range Threshold to make this decision.

If a higher segment meeting the thresholds is found, then this segment is added to the 2-D mass of the higher segment, otherwise this segment will become the top edge of a new 2-D mass of interest.

Group Across Azimuth (3-D Grouping)

Submodule 76 Output

Submodule 76 produces a list of volumetric (3-D) air masses with similar reflectivity values. The data associated with each member (a single air mass of interest) of the list includes:

An internal identifier.

The extreme positions of each of the six edges of the air mass as measured from the aircraft. That is, the range in azimuth, elevation, and range covered by the mass of interest.

Minimum, Maximum, and Average Reflectivity found within the air mass.

A sublist of radial components of this air mass. For each radial line segment which makes up the volumetric air mass, we track the following information:

Minimum and Maximum range of this radial segment.

Minimum, Maximum, and Average Reflectivity of this segment. Elevation and Azimuth of this segment.

Submodule 76 Input

Submodule 76 takes as input the list created by the Group Through Elevation (2-D Grouping) submodule described above. Submodule 76 logically operates on a full scan "look" of data at once.

The following operational parameter is also input to submodule 76 to fine tune its behavior: Adjacent Azimuth Threshold—A 2-D mass of interest in a single azimuth slice must be within a certain number of degrees in the azimuth direction (adjacent azimuth threshold) of a 2-D mass of a nearby slice in order to be logically considered part of the same 3-D volumetric mass.

Submodule 76 Process

This algorithm uses either the right-most azimuth slice or the left-most azimuth slice as the base for the grouping process. This allows for bidirectional radar scans. Each 2-D mass of interest in the base azimuth slice will become the right/left edge of a 3-D air mass in the final output list of this module.

Working across from the second azimuth slice (next to the base azimuth slice) to the end azimuth slice at the opposite end of the scan: For each radial:

For each 2-D mass of interest in this azimuth slice:

Determine a "bounding box" and "centroid" for this mass in this slice.

Look through nearby (within Adjacent Azimuth Threshold) previous azimuth slices find a neighboring 2-D mass with the same reflectivity characteristics as this mass.

If a previous segment meeting these requirements is found, then this mass is added to the 3-D mass of the previous segment, otherwise this mass will become the right/left edge of a new 3-D mass of interest.

Spectral Width

Module 80 Output

Module 80 produces at 88 a list of volumetric (3-D) air masses with similar radar spectral width values. The data associated with each member (a single air mass of interest) of the list includes:

An internal identifier.

The extreme positions of each of the six edges of the air mass as measured from the aircraft. That is, the range in azimuth, elevation, and range covered by the mass of interest.

Minimum, Maximum, and Average Spectral Width found within the air mass.

A sublist of radial components of this air mass. For each radial line segment (i.e. a portion of air mass between two range distances at a single elevation angle and a single azimuth angle from the aircraft's radar sensor) which makes up the volumetric air mass, we track the following information:

Minimum and Maximum range of this radial segment.

Minimum, Maximum, and Average Spectral Width of this segment.

Elevation and Azimuth of this segment.

Module 80 Input

Module 80 has as input the spectral width data samples from the volumetric scanning pattern as previously described.

Submodules 82, 84 and 86

Air masses of interest are found by going through three major steps. First, we look for segments on the radial of similar radar spectral widths. Second, the segments found on each radial are compared to segments found in similar positions on the radial above it. Through these comparisons, we form a collection of 2-D air masses with similar reflectivities. This process is repeated for all radials in a single azimuth slice of the scan (i.e. a single scan through elevations). Third, the 2-D air masses of one azimuth slice are compared with the 2-D air masses of adjacent azimuth slices. These comparisons form the final collection of 3-D air masses which are the output of this module.

Radial Range Bin Grouping (1-D Grouping)

Submodule 82 Output

Submodule 82 creates a list of segments of interest on each radial. The information currently included for each segment in the list includes:

Minimum and Maximum range of this radial segment.

Minimum, Maximum, and Average Spectral Width of this segment.

Elevation and Azimuth of this segment.

Submodule 82 Input

The unit of input to submodule 82 is a set of spectral width values along a single radar radial. There is one spectral width value for each range bin along the radial.

The following operational parameters are also input to submodule 82 to fine tune its behavior:

Spectral Width Threshold—Only consider segments with a Spectral Width greater than this.

Bin Count Threshold—Only consider segments containing at least this many Range Bins.

Test Count Threshold—M of N test criteria to help filter spurious data within a potential segment.

Break Count Threshold—The number of Range Bins below the Spectral Width Threshold needed to determine a break between groups (hence, used to find the end of a group.)

Minimum Range—Only consider segments at or beyond this range distance.

Submodule 82 Process

Starting at the Far End of the radial, inward to the Minimum Range:

Find the start (far end) of a segment of interest (a spectral width over threshold) An M of N sliding window check is performed to be sure that a Range Bin suspected of being the start of a group is not just a noisy value compared to neighboring Range Bins.

Find the end (near end) of a segment of interest (use Break Count Threshold to confirm).

Add this segment to the list of 1-D segments of interest if each of the following thresholds is met: Bin Count Threshold, Spectral Width Threshold.

Look for the start of the next segment of interest.

Group Through Elevation (2-D Grouping)

Submodule 84 Output

Submodule 84 creates a list of 2-D air masses of interest within a given azimuth slice. The structure of this 2-D air mass list is identical to the 3-D air mass list described below as the output of final submodule 86. Each member of this list will contain information of each set of radial segments that have been determined to belong to the same 2-D feature in the air mass.

Submodule 84 Input

Submodule 84 takes as input the list created by Radial Range Bin Grouping (1-D Grouping) submodule 82 described above. Submodule 84 will operate on a single azimuth slice of radials at once.

The following operational parameters are also input to submodule 84 to fine tune its behavior:

Adjacent Elevation Threshold—A segment of interest must be within a certain number of degrees in the elevation direction (adjacent elevation threshold) of a segment on another radial in order to be logically considered part of the same 2-D mass.

Adjacent Range Threshold—Segments on separate radials within the Adjacent Elevation Threshold must also be within similar range distances from the sensor. Segments may be considered part of the same mass if they are within this linear range distance of each other.

Submodule 84 Process

The highest elevation radial is the base for this grouping process.

Each segment of interest on this radial will become the top edge of a 2-dimension mass of interest.

Working downward from the second highest elevation radial to the lowest elevation radial: For each radial:

For each 1-D segment of interest on this radial:

Check the 1-D segments on the radials above this radial to find a higher segment which has the same spectral width characteristics as this segment. Consider the Adjacent Elevation Threshold and Adjacent Range Threshold to make this decision.

If a higher segment meeting the thresholds is found, then this segment is added to the 2 dimension mass of the higher segment, otherwise this segment will become the top edge of a new 2-D mass of interest.

Group Across Azimuth (3-D Grouping)

Submodule 86 Output

Submodule 86 produces a list of volumetric (3-D) air masses with similar spectral width values. The data associated with each member (a single air mass of interest) of the list includes:

An internal identifier.

The extreme positions of each of the six edges of the air mass as measured from the aircraft. That is, the range in azimuth, elevation, and range covered by the mass of interest.

Minimum, Maximum, and Average Spectral Width found within the air mass..

A sublist of radial components of this air mass. For each radial line segment (i.e. a portion of air mass between two range distances at a single elevation angle and a single azimuth angle from the aircraft's radar sensor) which makes up the volumetric air mass, we track the following information:

Minimum and Maximum range of this radial segment.

Minimum, Maximum, and Average Spectral Width of this segment.

Elevation and Azimuth of this segment.

Submodule 86 Input

Submodule 86 takes as input the list created by the Group Through Elevation (2-D Grouping) submodule described above. Submodule 86 logically operates on a full scan "look" of data at once.

The following operational parameter is also input to submodule 86 to fine tune its behavior: Adjacent Azimuth Threshold—A 2-D mass of interest in a single azimuth slice must be within a certain number of degrees in the azimuth direction (adjacent azimuth threshold) of a 2-D mass of a nearby slice in order to be logically considered part of the same 3-D volumetric mass.

Submodule 86 Process

This algorithm uses either the right-most azimuth slice or the left-most azimuth slice as the base for the grouping process. This allows for bidirectional radar scans. Each 2-D mass of interest in the base azimuth slice will become the right/left edge of a 3-D air mass in the final output list of this module.

Working across from the second azimuth slice (next to the base azimuth slice) to the end azimuth slice at the opposite end of the scan: For each radial:

For each 2-D mass of interest in this azimuth slice:

Determine a "bounding box" and "centroid" for this mass in this slice

Look through nearby (within Adjacent Azimuth Threshold) previous azimuth slices find a neighboring 2-D mass with the same spectral width characteristics as this mass.

If a previous segment meeting these requirements is found, then this mass is added to the 3-D mass of the previous segment, otherwise this mass will become the right/left edge of a new 3-D mass of interest.

3-D Spatial Feature Association and Filtering Module 90

The purpose of module 90 is to combine the data outputs (for a single full scan look) of the previous four data grouping modules: Divergences/Convergences 50, Rotations 60, Reflectivity 70, and Spectral Width 80. Filtering criteria are also applied to the 3-D grouped air masses to remove the noise and clutter influences from the contents of the resultant 3-D air masses of interest list.

Module 90 Output

Module 90 outputs a list of 3-D air masses of interest which combines the data of the input lists, and filters out the air masses which do not contribute to (or even distract from) the detection of microbursts and wind shear events.

Module 90 produces 3D observation representations a list of volumetric (3-D) air masses with similar characteristics which may indicate the presence of a microburst or wind shear threat. The data associated with each member (a single air mass of interest) of the list includes:

An internal identifier.

The extreme positions of each of the six edges of the air mass as measured from the aircraft. That is, the range in azimuth, elevation, and range covered by the mass of interest.

Minimum, Maximum, and Average Shear Value and Shear Momentum found within the air mass.

Minimum, Maximum, and Average Rotation Shear Value and Rotation Momentum within the air mass.

Minimum, Maximum, and Average Reflectivity and Spectral Width Values within the air mass.

A sublist of radial components of this air mass. For each radial line segment (i.e. a portion of air mass between two range distances at a single elevation angle and a single azimuth angle from the aircraft's radar sensor) which makes up the volumetric air mass,, we track the following information:

Minimum and Maximum range of this radial segment.

Change in air velocity over this segment.

Shear Value of this segment.

Shear Momentum of this segment.

Hazard Factor for this segment.

Minimum, Maximum, and Average Reflectivity for this segment.

Minimum, Maximum, and Average Rotation Shear Value and Rotation Momentum for this segment.

Minimum, Maximum, and Average Spectral Width for this segment.

Elevation and Azimuth of this segment.

Module 90 Input

The major input to module 90 are the output lists of these modules:

Divergence/Convergence module 50

Reflectivity module 70

Spectral Width module 80

Rotations module 60

See these modules' descriptions contained herein for details of the data in these lists.

In addition, known 3-D microburst characteristics in the form of stored data models are input for aiding in the filtering process.

The following operational parameters are also input to module 90 to fine tune its performance:

Minimum Group Area - 3-D masses on a single elevation must be larger than this minimum area to be considered as a possible wind shear or microburst threat. (This helps eliminate ground clutter and noise. This parameter is determined by typical microburst size and the desired sensitivity of the warning system.)

Module 90 Process

The approach of the algorithm is:

Establish knowledge of potential ground clutter regions within the grid of resolution cells (35) from the volumetric scanning pattern (30). Parameters from the volumetric scan pattern (azimuth, elevation and range sampling intervals) are used to establish this knowledge along with information relating to the antenna position to the airframe, airframe attitude, and antenna beam width. A "flat earth" model is used to determine intersection points of the resolution cell grid with the earth's surface.

Strip out 3-D masses within the Divergences/Convergences list which are composed of segments on only a single radial. (These will usually be the result of ground clutter or noise.)

Strip out 3-D masses within the Divergences/Convergences list which exist only on a single elevation plane (usually ground clutter) that have a surface area smaller than Minimum Group Area.

Strip out 3-D masses within the Divergences/Convergences list that are located in potential ground clutter regions (from knowledge established as described above) and have no corroborating evidence in elevations where ground clutter is known not to be present.

Merge Reflectivity values and Spectral Width values from corresponding 3-D air masses in the other input lists into the stripped list to create the output list of 3-D air masses of interest.

Contextual Feature Matching and Temporal Tracking

Module 100 has two principle functions. One, to track features output by the 3-D spatial feature association and filtering module over the course of multiple "looks". Hence the development of significant features of interest will be tracked as time progresses. This will allow us to spot the development of microbursts and give the ability to predict where a wind shear may exist within the next few minutes. (The leading edge of a microburst will descend from high altitudes toward the ground. Our data tracking allows us to spot this.) Significant features are tracked relative to the aircraft as the aircraft moves through previously scanned areas. Changes in the radar's perspective are compensated for on significant features to aid tracking of those features.

The second function is to compare data configurations of significant features with stored data models of contextual features known to exist with microbursts and wind shear conditions computer memory 101 is provided to more model data. The spatial relationship between diverging, converging and rotating wind fields as well as high spectral width and high radar reflectivity regions comprises the basic microburst model. In addition, knowledge of the time history evolution of the model is incorporated in the algorithm. The model-feature comparison operation draws upon techniques recently and currently being developed in the computer science subfields of Knowledge Engineering, Machine Learning, and Contextual Pattern Matching.

Module 100 Output

The ultimate output of module 100 is a set of alerts and warnings to the pilot and flight deck crew of the aircraft. The minimum warning time is fifteen to thirty seconds before the aircraft may pass through a wind shear or microburst event. The form of the alert will be both audible and visual alerts and a radar screen display showing the position of hazard events relative to the aircraft and its course.

Module 100 Input

The lists of 3-D air masses of interest from the 3-D Spatial Feature Association and Filtering module will be collected for each "look" or full radar scan. Multiple "looks" will be used for Temporal Tracking.

The algorithm will also have stored data models of known wind shear contextual features to assist in confirming microburst and wind shear conditions.

Module 100 Process

The lists of 3-D air masses of interest along with the volumetric scan pattern sampling interval descriptions, relationship of antenna position to the airframe, and ancillary airframe attitude, position and motion information form the "world observation model" of the wind shear measurement system. This world observation model is the clearinghouse for all current information regarding system observations. It also serves as the event "tracking file", keeping track of air mass of interest motion relative to the airframe and changes in features observed within each air mass of interest.

Based on the data contained in the world observation model described above and the stored a priori 3-D microburst data models (previously described), module 100 performs the following functions:

Match to contextual models: The data in the world observation model are matched to known "a priori" 3-D microburst data models (contextual models). This matching process can be performed with one of many techniques used in pattern matching that produces a match confidence value. The particular technique selected for this application is an evidence accrual technique, since all microburst features may not necessarily be observable in all cases. Evidence accrual techniques such as the Dempster Schaffer technique can be formulated to accrue only available evidence to formulate a match confidence (or "degree" of match).

Track position and feature propagation from look to look: The position and observed features and spatial orientation of observed features are tracked from look to look. This is also called temporal tracking, since potential microburst position and characteristics are tracked over time. Included in this tracking function is spatial location association based on airframe motion and scanning parameters, feature similarity comparisons to alleviate potential mismatches, and the tracking of multiple air masses of interest.

Predicting state of microburst evolution: Based on tracked observed air mass features over time, a prediction of microburst characteristics in the next few minutes of time can be made. This operation is performed on the world observation model based on feature tracking over time and on known microburst evolution information. As an example, it has been observed that microbursts evolve from converging winds in the upper atmosphere, followed by a falling high reflectivity core of air. These features are observed and tracked by the tracking function. The prediction function predicts a hazardous divergence in the aircraft's flight path (lower elevations) if enough evidence of these features is present in the world observation model.

Wind shear indication: When a region in the world observation model is of sufficient hazard to the aircraft and is observed with sufficient confidence level, cockpit alert indications will be generated. These indications will have at least two levels advisory and warning. The advisory alert is given when the wind shear is of no immediate danger to the aircraft (30 seconds—several minutes away) and the warning is given if more immediate danger is present (wind shear 15–30 seconds away). As previously stated the indicators will be both visual and aural cues, as well as position information on a cockpit radar display or similar device.

Figure 5A:
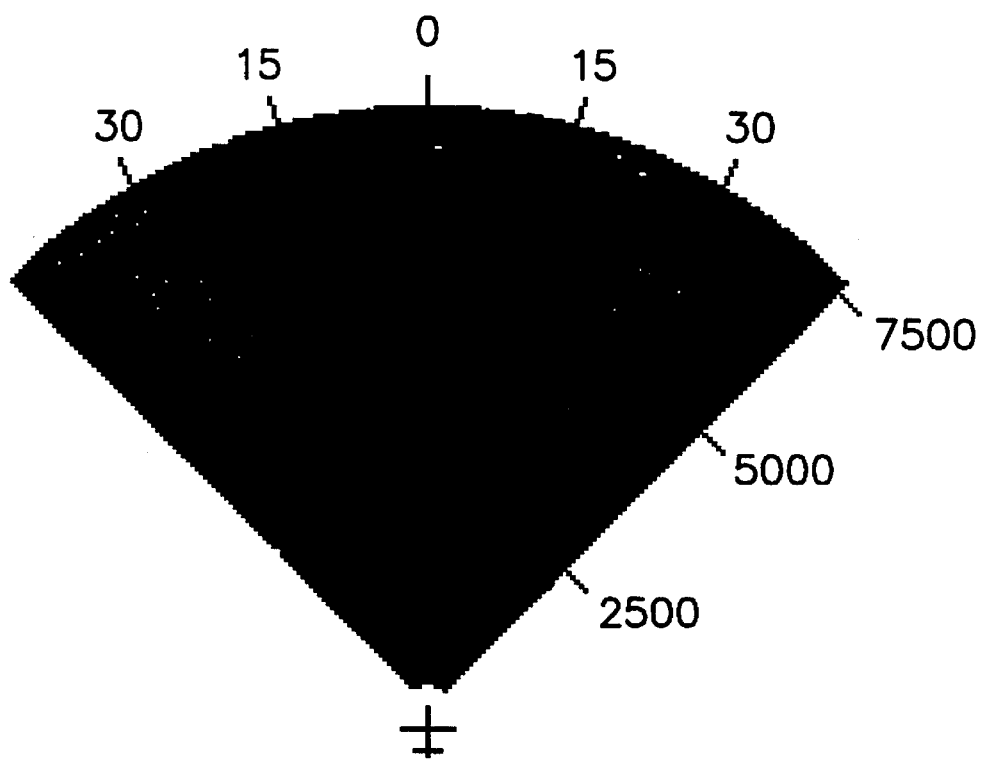
FIGS. 5a, 5b, and 5c represent simulated input data for a wet microburst case.
Figure 5C:
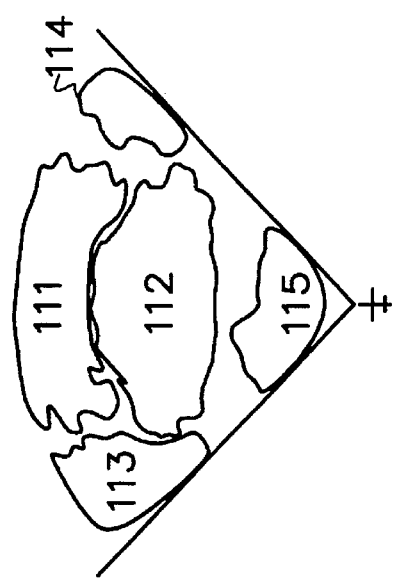

Simulation display information is provided herein in FIGS. 5 and 6 for a simulated "wet" microburst example, and in FIGS. 7 arid 8 for a simulated "dry" microburst example. Each display shows one elevation plane of data from the volumetric scan. The elevation plane shown is the lowest elevation scanned for these examples, 3 degrees above aircraft glide slope. All displays show azimuth in degrees along the top of the display, and range in meters along the right side of the display.

FIG. 5a represents one elevation plane of data provided to the reflectivity module 70.

Figure 5B:
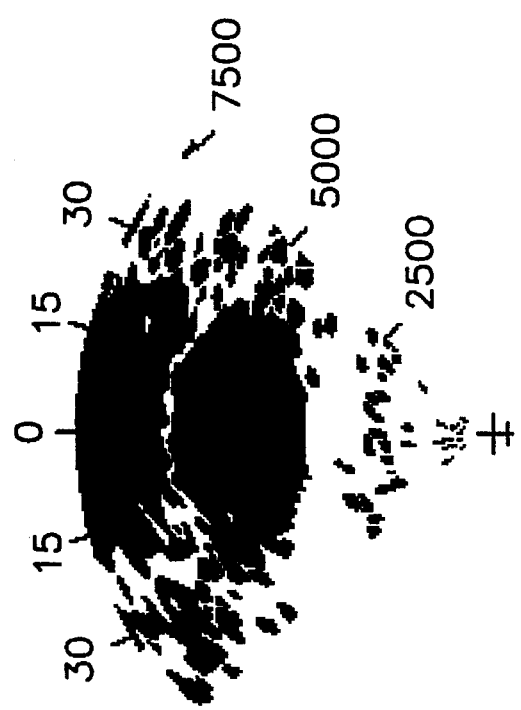

FIG. 5b represents one elevation plane of data fed into the Divergence/Convergence module 50 and the Rotations module 60. This image divides into two obvious air flow zones. Area 111 has a positive air velocity (tailwind) and area 112 has a negative velocity (headwind). Area 115 is primarily the result of radar sensor "side lobe echo" and clutter. Areas 113 and 114 are primarily the result of ground clutter.

Figures 6A, 6B:
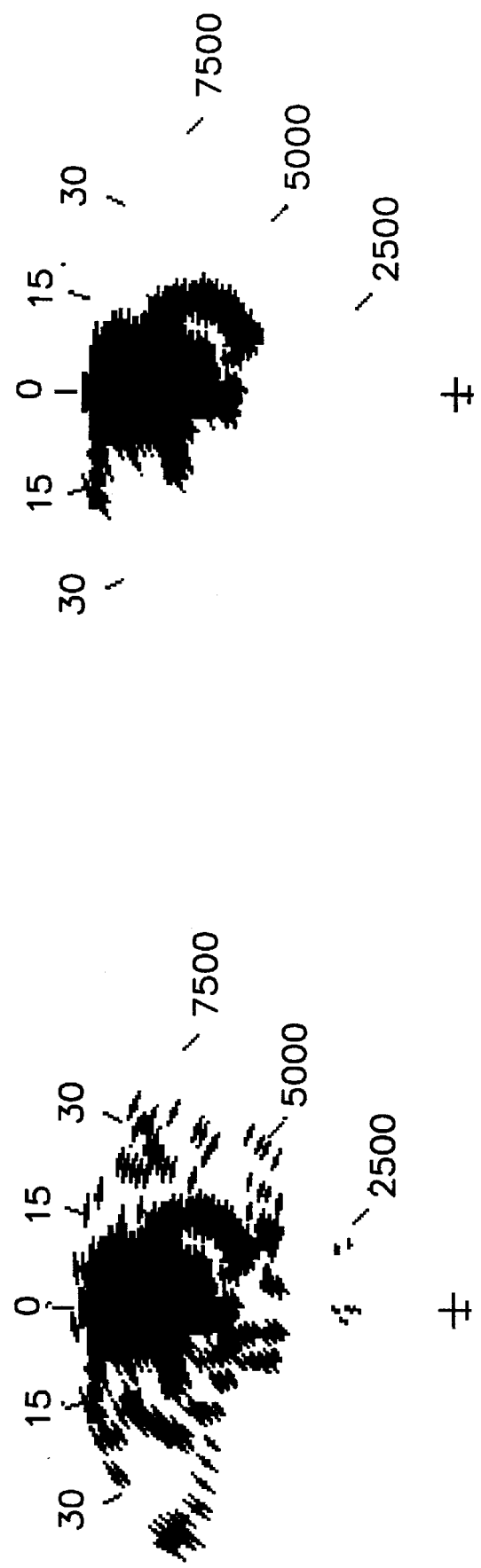
FIG. 6a and 6b represent output data obtained with the present invention from the simulated wet microburst input data of FIG. 5a, 5b and 5c.

FIG. 6a represents one elevation plane of the data output of Divergence/Convergence module 50. Many areas of interest are shown in FIG. 6a.

The output of Divergence/Convergence module 50 is then fed into 3-D Spatial Feature Association and Filtering module 90 and the output of module 90 produces the display of FIG. 6b. It can be seen that the many areas of interest of FIG. 6a are filtered down to two main areas of interest in FIG. 6b. The darker area is a zone of negative shear value and the larger lighter gray area is a large zone of positive shear value.

Figure 7B:
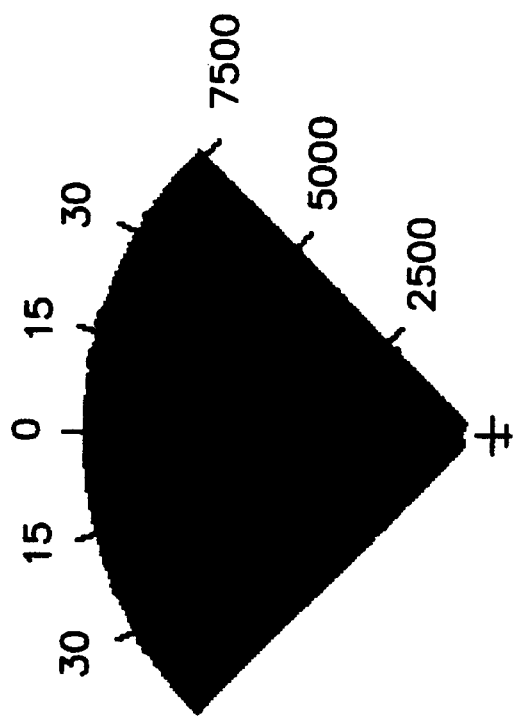
FIG. 7a and 7b represent simulated input data for a dry microburst case.
Figure 7A:
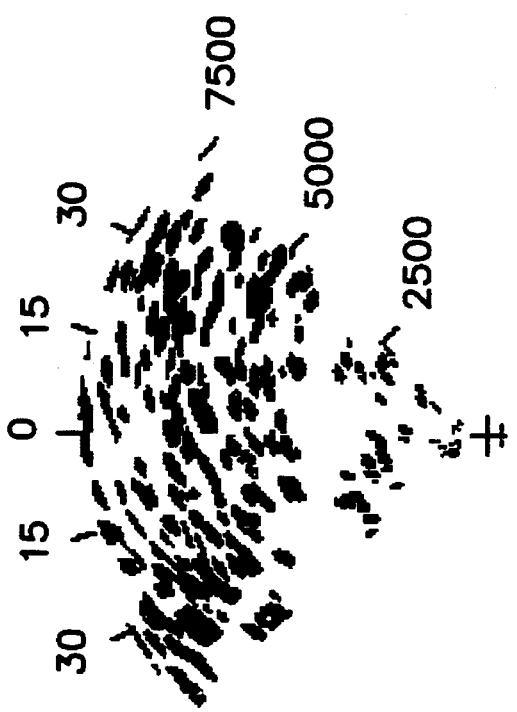

FIG. 7a represents one elevation plane of raw radar reflectivity data for a simulated "dry" microburst which is fed into reflectivity module 70.

FIG. 7b represents one elevation plane of raw radar velocity data for a simulated "dry" microburst that is fed into Divergence/Convergence Processor 50 and Rotations Processor 60. These are mostly blobs of negative velocity which turn out to be mostly ground clutter. There are a few small zones of positive velocity.

Figures 8A, 8B:
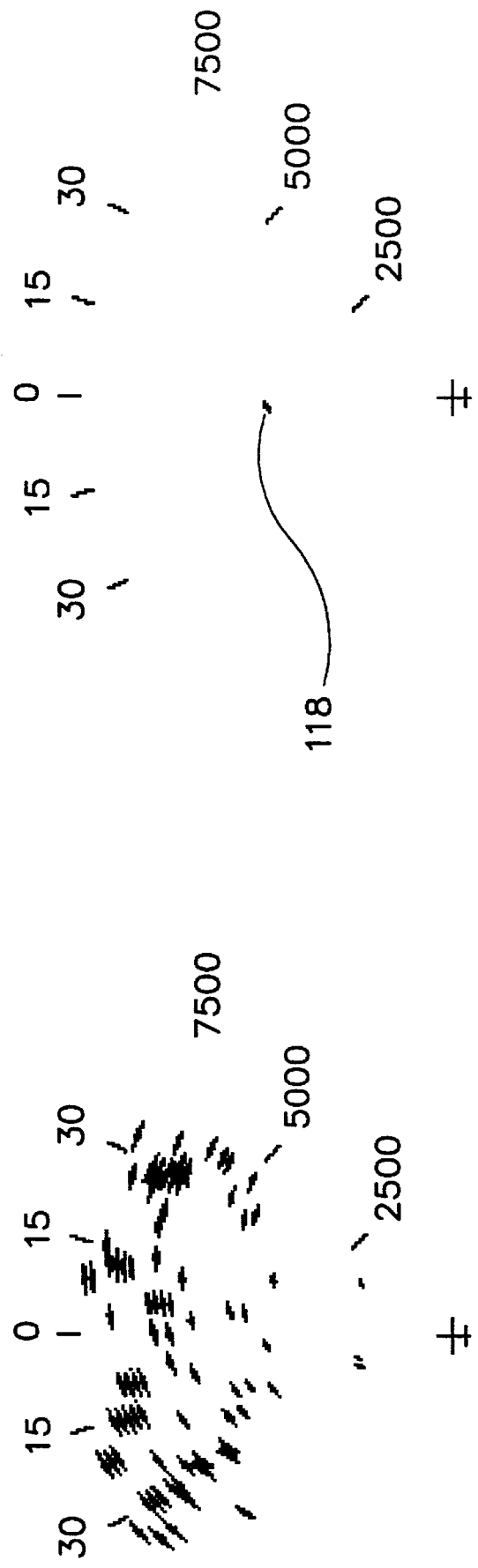
FIGS. 8a and 8b represent output data obtained with the present invention from the simulated dry microburst data of FIG. 7a and 7b.

FIG. 8a represents the data output of Divergence/Convergence module 50.

The output of Divergence/Convergence module 50 is then fed into 3-D Spatial Feature Association and Filtering module 90 and the output of module 90 produces the display of FIG. 8b. In the "dry" case, all but one of the areas of interest from the Divergence/Convergence module 50 output were filtered out.

The one remaining blob 118 in FIG. 8b is the "dry" microburst, as corroborated by data at higher elevations scans. The rest of the areas of interest of 8a were clutter. While the blob in FIG. 8b may seem small, it represents a mass of air on the planes flight path that is approximately 100 meters across, 150 meters long and 200 meters high and is at a distance of 3.9 KM in front of the plane.

Now that the construction and operation of the present invention have been set forth, certain advantages can be set forth and appreciated. Another approach to airborne wind shear detection is to use high resolution spectral editing. In this approach the system attempts to identify clutter by looking at the doppler spectrum of the clutter. The high resolution spectral editing approach requires a much more sophisticated radar set with its attendant high cost. The present invention takes the approach of recognizing the microburst features and then editing the clutter based on the recognized features. The present invention can be implemented with less sophisticated and lower cost radar hardware than the doppler spectrum approach. In addition, because of the availability of upper atmospheric data provided by the volumetric scan 30 of the present invention, there is more information on which to predict a hazardous wind shear condition. The additional information available with the present invention will result in a system that will have a higher detection probability and fewer alarms. Further, with regard to detection performance, microbursts can be recognized with the present invention in there very early stages and well in advance of the aircraft.

In accordance with the foregoing description, Applicants have developed an airborne wind shear detection system that builds on conventional airborne doppler weather radar systems. Although a specific embodiment of Applicants' invention is shown and described for illustration purposes, a number of variations and modifications will be apparent to those of ordinary skill in the relevant arts. It is not intended that coverage be limited to the disclosed embodiment, but only by the terms of the following claims.

We claim:

1. A wind shear detection system comprising:

antenna means for mounting on an aircraft;

antenna driver means, connected to said antenna means, for driving said antenna means to scan in elevation and azimuth along the aircraft flight path;

transceiver means, connected to said antenna means, for generating a transmitted signal and for receiving reflected data;

base data processor means, connected to said transceiver means, for processing the reflected data and providing atmospheric measurement data for individual resolution cells that can be formed into a 3-D grid of atmospheric data samples;

base data filter means, connected to said base data processor means, for removing receiver noise from said atmospheric measurement data and providing filtered atmospheric measurement data;

volumetric feature extraction means connected to said base data filter means, for identifying a plurality of features within the 3-D grid of the filtered atmospheric measurement data and grouping said atmospheric data samples having a first feature into first air masses of interest and grouping said atmospheric data samples having a second feature into second air masses of interest;

spatial feature association and filtering means, connected to said volumetric feature extraction means, for combining said first air masses of interest with said second air masses of interest to provide a 3-D representation of atmospheric conditions; and contextual matching means for comparing said 3-D representation of atmospheric conditions to a known wind shear atmospheric conditions model and providing an output signal when a wind shear threshold condition is exceeded.

2. A windshear detection system comprising:

an airborne scanning doppler radar transceiver having a three dimensional volumetric scanning pattern providing measurements that can be formed into a three dimensional grid of atmospheric data samples with each data sample having a mean radial velocity and being characterized by a rage, azimuth and elevation;

means for identifying first radial line segments further for identifying second radial line segments wherein consecutive data samples within said first radial line segments have mean velocity differentials in a first direction;

means for comparing each said first radial line segment to any said first radial line segment located in a similar position on a radial above each said first radial line segment to form first 2-D air masses having mean velocity differentials in a first direction;

means for comparing each said first 2-D air mass further for comparing each said second 2-D air mass to any said first 2-D air masses located adjacent to each said first 2-D air mass to form first 3-D air masses having mean velocity differentials in a first direction and representing potential diverging wind conditions;

means for identifying second radial line segments wherein consecutive data samples within said second radial line segments have mean velocity differentials in a second direction;

means for comparing each said second radial line segment to any said second radial line segment located in a similar position on a radial above each said second radial line segment to form second 2-D air masses having mean velocity differentials in a second direction; and means for comparing each said second 2-D air mass to any said second 2-D air masses located adjacent to each said second 2-D air mass to form second 3-D air masses having mean velocity differentials in a second direction and representing potential converging wind conditions.

3. Windshear detection system of claim 2 further comprising:

3-D spatial feature association and filtering means for spatially associating said first 3-D air masses and said second 3-D air masses to provide a single full volumetric scan spatial representation for filtering noise and clutter from said single full volumetric scan spatial representation to reveal diverging wind condition locations and converging wind condition locations.

4. Windshear detection system of claim 3 wherein said 3-D spatial feature association and filtering means further comprises means for establishing knowledge of potential ground clutter regions within said three dimensional grid and removing 3-D air masses located within said potential ground clutter regions which are not corroborated by atmospheric data sample measurements at higher elevations that are known not to include ground clutter.

5. Windshear detection system of claim 3 wherein said airborne scanning doppler radar has an antenna mounted to an airframe and said means for establishing knowledge of potential ground clutter regions comprises means for relating parameters from said volumetric scan pattern to information on the attitude of said airframe, position of said antenna relative to said airframe and beam width of said antenna.

6. Windshear detection system of claim 5 further comprising:

means for storing first data models of known relationships of diverging wind condition locations and converging wind condition locations in a microburst; and contextual matching and temporal tracking means for comparing said single volumetric scan spatial representation to said first stored data models to determine contextual matching.

7. Windshear detection system of claim 6 further comprising means for providing an alerting signal when said diverging wind condition locations and said converging wind condition locations exceed a predetermined contextual matching threshold when compared to said stored data models.

8. Windshear detection system of claim 6 wherein said first stored data models include a time history evolution of spatial relationships between diverging wind condition locations and converging wind condition locations which are known to exist for microburst and windshear conditions and said contextual matching and temporal tracking means further comprises:

means for tracking said diverging wind condition locations and said converging wind condition locations over multiple volumetric scans occurring over a first period of time; and means for comparing said volumetric scans to said stored first data models which include a time history evolution to permit prediction of where a windshear condition may occur within a second period of time.

9. Windshear detection system of claim 5 further comprising:

means for identifying third radial line segments wherein consecutive data samples within said third radial line segments have similar reflectivities;

means for comparing each said third radial line segment to any said third radial line segment located in a similar position on a radial above each said third radial line segment to form third 2-D air masses having similar reflectivities; and means for comparing each said third 2-D air mass to any said third 2-D air masses located adjacent to each said fourth 2-D air mass to form third 3-D air masses having similar reflectivities.

10. Windshear detection system of claim 9 further comprising:

means for identifying fourth radial line segments wherein consecutive data samples within said fourth radial line segments have similar spectral widths;

means for comparing each said fourth radial line segment to any said fourth radial line segment located in a similar position on a radial above each said fourth radial line segment to form fourth 2-D air masses having similar spectral widths; and means for comparing each said fourth 2-D air mass to any said fourth 2-D air masses located adjacent to each said fourth 2-D air mass to form fourth 3-D air masses having similar spectral widths.

11. Windshear detection system of claim 10 wherein said 3-D spatial feature association and filtering means further comprises:

means for merging reflectivity values for said third 3-D air masses and spectral width values for said fourth 3-D air masses with said diverging wind condition locations and said converging wind condition locations;

said storage means further comprises means for storing third data models of known relationships of diverging wind condition locations, converging wind condition locations, reflectivity values and spectral width values in a microburst; and said contextual matching and temporal tracking means further comprises means for comparing said single volumetric scan spatial representation to said stored third data models to determine contextual matching.

12. Windshear detection system of claim 11 wherein said stored data models include a time history evolution of spatial relationships between diverging wind condition locations, converging wind condition locations, reflectivity values and spectral width values which are known to exist in microburst and said contextual matching and temporal tracking means further comprises:

means for tracking said locations of said 3-D air masses having similar reflectivities and said 3-D air masses having similar spectral widths over multiple volumetric scans occurring over a third period of time; and means for comparing said volumetric scans to said stored second data models which include a time history evolution to permit prediction of where a windshear condition may occur within a fourth period of time.

13. Windshear detection system of claim 2 further comprising:

means for identifying cross azimuth arc segments having similar velocity differentials between consecutive range bins on said cross azimuth arc segments;

means for comparing each said cross azimuth arc segment to any said cross azimuth arc segment at a similar azimuth angle and a similar elevation to form fifth 2-D air masses having similar rates of changing velocity in a cross azimuth direction;

means for comparing each said third 2-D air mass to any said third 2-D air mass located on an elevation plane above each said third 2-D air mass to form fifth 3-D air masses having similar rates of changing velocity in a cross azimuth direction; and said 3-D spatial feature association and filtering means further comprises means for removing noise and clutter influences form said fifth 3-D air masses to reveal the location of rotating wind conditions.

14. Windshear detection system of claim 13 wherein said 3-D spatial feature association and filtering means further comprises:

means for spatially associating said first 3-D air masses said second 3-D air masses and said fifth 3-D air masses to provide a single full volumetric scan spatial representation; and means for filtering noise and clutter form said single full volumetric scan spatial representation to reveal diverging wind condition locations, converging wind condition, locations, and rotating wind condition locations.

15. Windshear detection system of claim 14 wherein said 3-D spatial feature association and filtering means further comprises means for establishing knowledge of potential ground clutter regions within said three dimensional grid and removing 3-D air masses located within said potential ground clutter regions which are not corroborated by atmospheric data sample measurements at higher elevations that are known no to include ground clutter.

16. Windshear detection system of claim 15 wherein said means for establishing knowledge of potential ground clutter regions further comprises means for relating parameters from said volumetric scan pattern to information on the attitude of said airframe, position of said antenna relative to said airframe and beam width of said antenna.

17. Windshear detection system of claim 16 wherein said first data models include known relationships of rotating wind conditions.

18. Windshear detection system of claim 17 wherein said time history evolution of spatial relationships includes rotating wind conditions and said means for tracking includes means for tracking rotating wind condition locations.

19. Windshear detection system of claim 18 further comprising:

means for identifying third radial line segments wherein consecutive data samples within said third radial line segments have similar reflectivities;

means for comparing each said third radial line segment to any said third radial line segment located in a similar position on a radial above each said third radial line segment to form third 2-D air masses having similar reflectivities; and means for comparing each said third 2-D air mass to any said third 2-D air masses located adjacent to each said third 2-D air mass to form fourth 3-D air masses having similar reflectivities.

20. Windshear detection system of claim 19 further comprising:

means for identifying fourth radial line segments wherein consecutive data samples within said fourth radial line segments have similar spectral widths;

means for comparing each said fourth radial line segment to any said fourth radial line segment located in a similar position on a radial above each said fourth radial line segment to form fourth 2-D air masses having similar spectral widths; and means for comparing each said fourth 2-D air mass to any said fourth 2-D air masses located adjacent to each said fourth 2-D air mass to form fourth 3-D air masses having similar spectral widths.

21. Windshear detection system of claim 20 further comprising:

means for merging reflectivity values for said third 3-D air masses and spectral width values for said fourth 3-D air masses with said diverging wind condition locations, converging wind condition locations; and said rotating wind condition locations;

means for storing fourth data models of known relationships of diverging wind condition locations, converging wind condition locations, rotating wind condition locations, reflectivity values and spectral width values in a microburst; and means for comparing said single volumetric scan spatial representation to said stored fourth data models to determine contextual matching.

* * * * *